(12) United States Patent
Saitou

(10) Patent No.: US 8,069,563 B2
(45) Date of Patent: Dec. 6, 2011

(54) BLADE STRUCTURE FOR TORQUE CONVERTER AND PROCESS FOR PRODUCING THE SAME

(75) Inventor: Kazumi Saitou, Numazu (JP)

(73) Assignee: JATCO Ltd, Fuji-shi (JP)

( * ) Notice: Subject to any disclaimer, the term of this patent is extended or adjusted under 35 U.S.C. 154(b) by 664 days.

(21) Appl. No.: 12/179,772

(22) Filed: Jul. 25, 2008

(65) Prior Publication Data

US 2009/0056127 A1 Mar. 5, 2009

(30) Foreign Application Priority Data

Aug. 31, 2007 (JP) ................................. 2007-225859

(51) Int. Cl.
*B23P 15/02* (2006.01)
(52) U.S. Cl. ......................................... 29/889.7; 416/43
(58) Field of Classification Search ................. 29/889.7, 29/889, 889.6; 416/43
See application file for complete search history.

(56) References Cited

U.S. PATENT DOCUMENTS

| | | | |
|---|---|---|---|
| 3,224,079 A | | 12/1965 | Dybvig |
| 5,996,391 A | * | 12/1999 | Mizobuchi ....................... 72/348 |
| 6,036,439 A | * | 3/2000 | Mizobuchi et al. ......... 415/213.1 |
| 6,053,024 A | * | 4/2000 | Yoshida ........................ 72/379.2 |
| 6,382,916 B1 | | 5/2002 | Gomi et al. |
| 2004/0250594 A1 | * | 12/2004 | Schwenk ........................ 72/348 |
| 2010/0037458 A1 | * | 2/2010 | Ranz et al. ....................... 29/889 |

FOREIGN PATENT DOCUMENTS

| | | |
|---|---|---|
| JP | 07-004496 A | 1/1995 |
| JP | 9-42413 A | 2/1997 |
| JP | 11-006556 A | 1/1999 |

OTHER PUBLICATIONS

U.S. Appl. No. 12/179,756, filed Jul. 25, 2008, Saitou.
U.S. Appl. No. 12/179,790, filed Jul. 25, 2008, Saitou.
Kazumi Saitou, U.S. PTO Office Action, U.S. Appl. No. 12/179,756, dated Aug. 3, 2011, 12 pages.
Kazumi Saitou, U.S. PTO Office Action, U.S. Appl. No. 12/179,790, dated Sep. 13, 2011, 8 pages.

* cited by examiner

*Primary Examiner* — David Bryant
*Assistant Examiner* — Moshe Wilensky
(74) *Attorney, Agent, or Firm* — Foley & Lardner LLP

(57) ABSTRACT

A blade structure for a torque converter, produced by a process including the steps of: stamping a flat blank into a first annular plate that includes a first connecting ring portion, a second connecting ring portion, and a plurality of blades spaced from each other in a circumferential direction of the first and second connecting ring portions; bending the blades into a curved shape curved with respect to the first annular plate; bending the blades to be inclined by a predetermined angle with respect to the first and second connecting ring portions; and expanding the first annular plate outwardly in a radial direction thereof to thereby form a predetermined annular shape that has a larger radial dimension than the first annular shape and a larger circumferential distance between respective adjacent two of the blades than that in the first annular plate.

14 Claims, 6 Drawing Sheets

BLADE STRUCTURE FOR TORQUE CONVERTER AND PROCESS FOR PRODUCING THE SAME

BACKGROUND OF THE INVENTION

The present invention relates to a blade structure for a torque converter and a process for producing the blade structure.

Torque converters are equipped with a plurality of blades that are mounted to a shell of a pump impeller or turbine runner in order to transmit power via fluid. Conventionally, the blades are assembled to the shell one by one, thereby causing increase in working time.

For the purpose of solving the above problem, there has been proposed a process of forming a blade member from a single steel sheet in which a plurality of blades are integrally connected with each other. Japanese Patent Application First Publication No. 9-042413 discloses such a blade member and a process of forming the blade member as explained above.

SUMMARY OF THE INVENTION

The conventional blade member as described in Japanese Patent Application First Publication No. 9-042413 is formed from a rectangular steel sheet. The steel sheet is stamped into a preform that includes a plurality of blades, an inner connecting portion connected with one end of each of the blades and an outer connecting portion connected with the other end of each of the blades. The preform is curved into an arcuate shape by adjusting an amount of folding the respective inner and outer connecting portions. The adjustment of the amount of folding is carried out for each of the blades by a computer-controlled robot. This process of folding is complicated to thereby cause low working efficiency.

It is an object of the present invention to provide a blade structure for a torque converter which can be easily and quickly produced, and a process for easily and quickly producing a blade structure for a torque converter.

In one aspect of the present invention, there is provided a blade structure for a torque converter, produced by a process comprising the steps of:

stamping a flat blank into a first annular plate that includes a first connecting ring portion, a second connecting ring portion disposed on a radial inside of the first connecting ring portion and a plurality of blades that are arranged to be spaced from each other in a circumferential direction of the first and second connecting ring portions, and connected with the first connecting ring portion on a radial outside of the blades and with the second connecting ring portion on a radial inside of the blades;

bending the blades into a curved shape curved with respect to the first annular plate;

bending the blades to be inclined by a predetermined angle with respect to the first connecting ring portion and the second connecting ring portion; and expanding the first annular plate outwardly in a radial direction thereof to thereby form a predetermined annular shape that has a larger radial dimension than the first annular shape and a larger circumferential distance between respective adjacent two of the blades than that in the first annular plate.

In a further aspect of the present invention, there is provided a process for producing a blade structure for a torque converter, comprising the steps of:

stamping a flat blank into a first annular plate that includes a first connecting ring portion, a second connecting ring portion disposed on a radial inside of the first connecting ring portion and a plurality of blades that are arranged to be spaced from each other in a circumferential direction of the first and second connecting ring portions, and connected with the first connecting ring portion on a radial outside of the blades and with the second connecting ring portion on a radial inside of the blades;

bending the blades into a curved shape curved with respect to the first annular plate;

bending the blades to be inclined by a predetermined angle with respect to the first connecting ring portion and the second connecting ring portion; and expanding the first annular plate in a radial direction thereof to thereby form a predetermined annular shape that has a larger radial dimension than the first annular shape and a larger circumferential distance between respective adjacent two of the blades than that in the first annular plate.

DETAILED DESCRIPTION OF THE INVENTION

Figure 1:
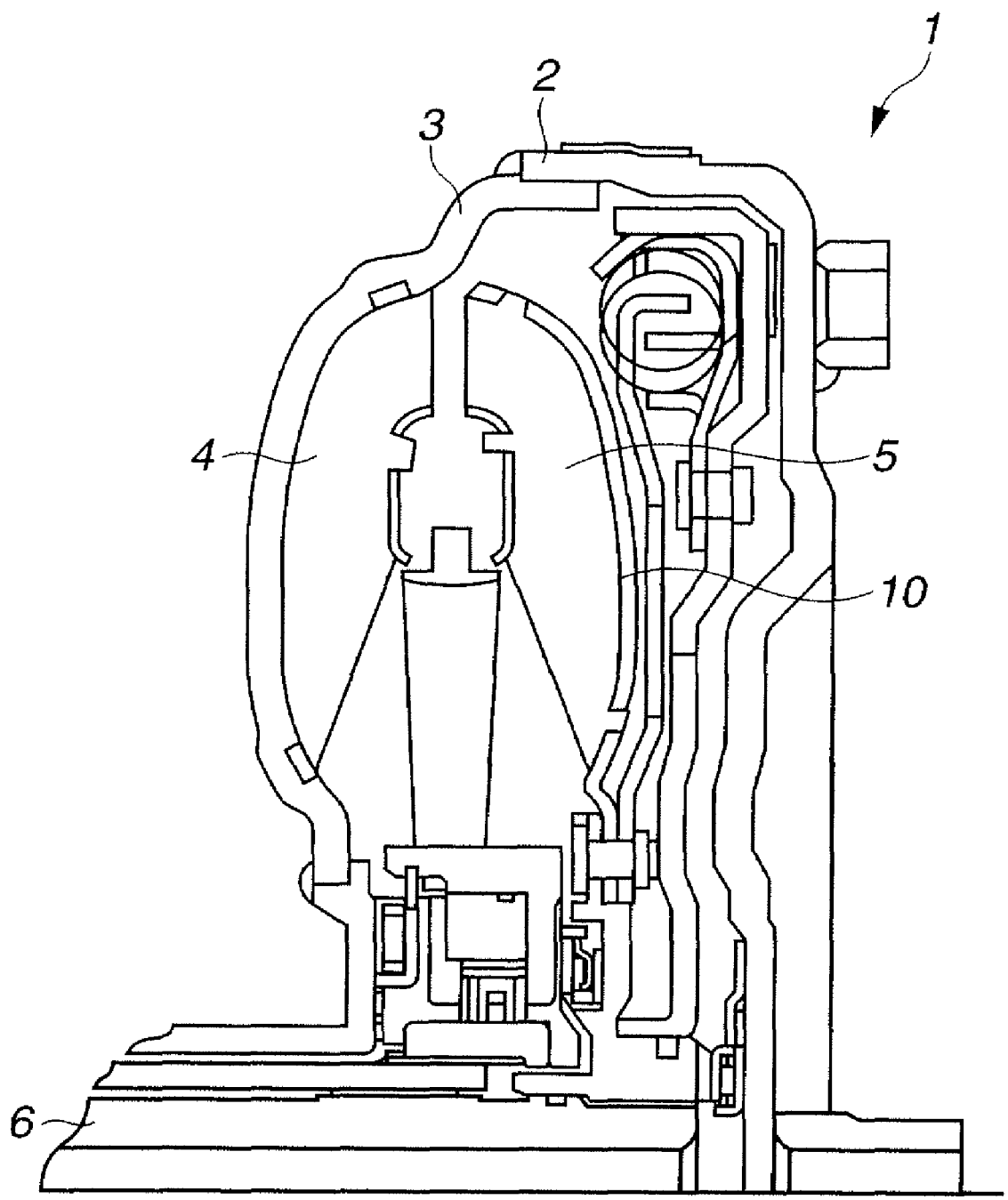
FIG. 1 is a schematic diagram showing a torque converter including a turbine runner that has a blade structure according to an embodiment of the present invention.

In the followings, an embodiment of the present invention will be described with reference to the accompanying drawings. FIG. 1 schematically illustrates torque converter 1 to which a blade structure of the embodiment of the present invention can be applied. Torque converter 1 serves as a fluid coupling disposed between an engine (not shown) and an automatic transmission (not shown) in a vehicle (not shown).

As shown in FIG. 1, torque converter 1 includes front cover 2, rear cover 3, pump impeller 4, turbine runner 5 and output shaft 6. Front cover 2 is mounted to the engine and receives rotation from the engine. Rear cover 3 is fixedly coupled to front cover 2 and makes a unitary rotation with front cover 2. Pump impeller 4 is fixedly mounted to an inner wall of rear cover 3. Turbine runner 5 is disposed between front cover 2 and rear cover 3 and opposed to pump impeller 4. Output shaft 6 is coupled to the automatic transmission and transmits rotation from turbine runner 5 to the automatic transmission.

Turbine runner 5 includes substantially annular turbine shell or shell member 10 and blade structure 11 that is joined with turbine shell 10.

Figure 2A:
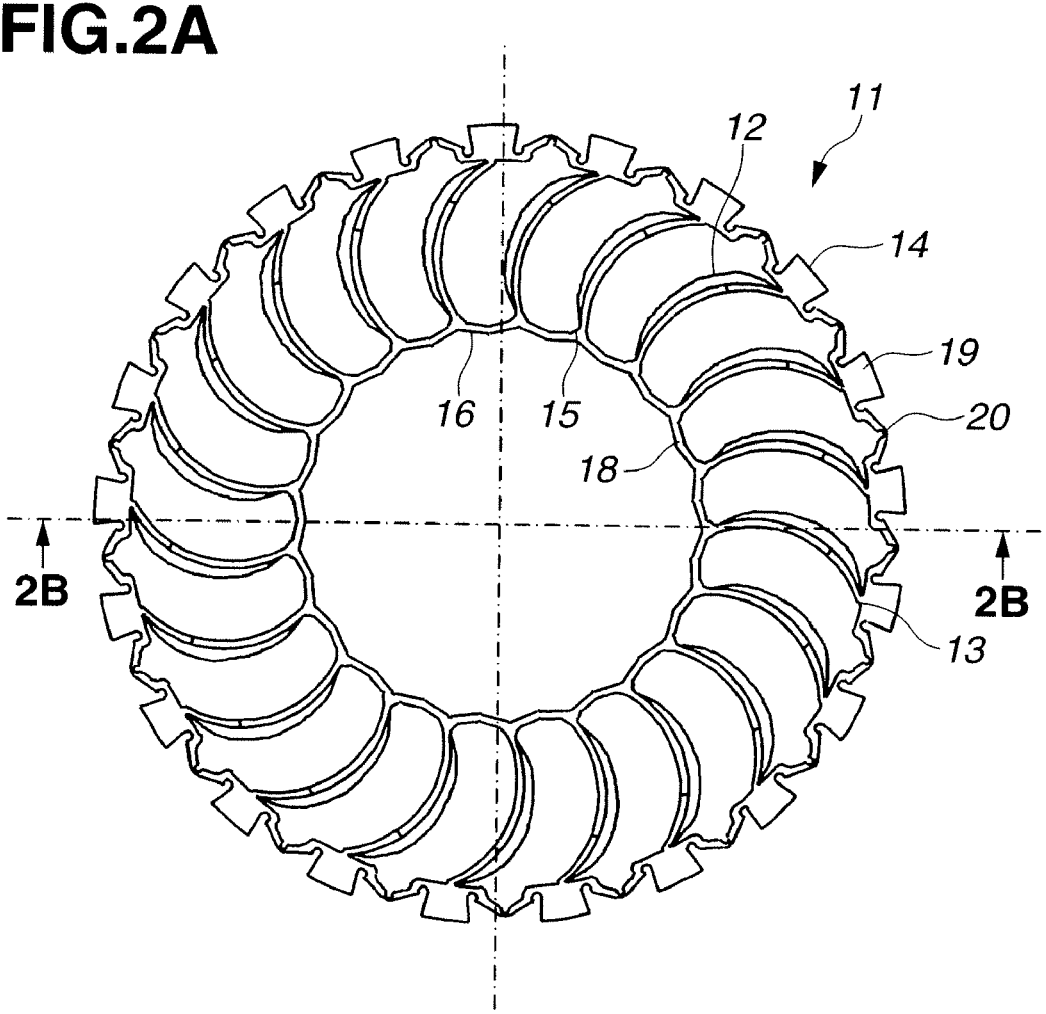
FIG. 2A is a plan view of the blade structure of the embodiment when viewed from a side of a pump impeller of the torque converter.
Figure 2B:
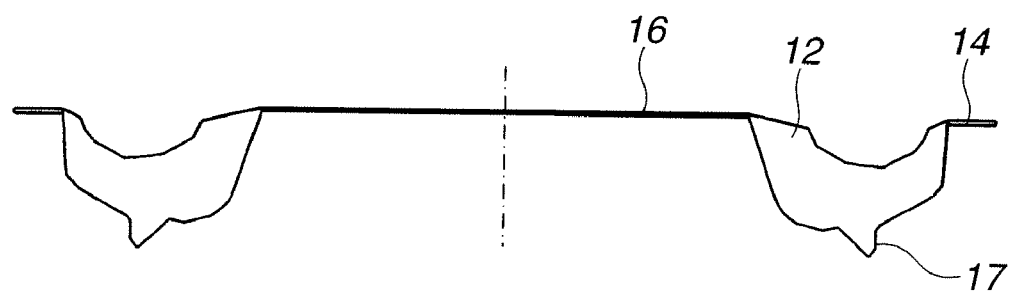
FIG. 2B is a sectional view of the blade structure, taken along line 2B-2B shown in FIG. 2A.

Referring to FIGS. 2A and 2B, blade structure 11 is explained in detail. Blade structure 11 has a generally annular or ring shape as a whole and includes a plurality of blades 12 that are arranged to be spaced by a predetermined distance apart from each other in a circumferential direction of blade structure 11.

Blade structure 11 further includes first connecting ring portion 14 that is in the form of an annular or ring-shaped plate, and second connecting ring portion 16 that is in the form of an annular or ring-shaped plate and disposed on a radial inside of first connecting ring portion 14. First connecting ring portion 14 is joined with an inner wall of turbine shell 10 and connected to blades 12 through first bridge portions 13. Second connecting ring portion 16 is joined with the inner wall of turbine shell 10 and connected to blades 12 through second bridge portions 15. Each of blades 12 are thus connected with first connecting ring portion 14 on a radial outside thereof and with second connecting ring portion 16 on a radial inside thereof. Blade structure 11 is formed from a single metal plate as explained in detail later.

Specifically, first connecting ring portion 14 includes a plurality of first bridge portions 13 that are spaced from each other in a circumferential direction of first connecting ring portion 14 and connected with blades 12, respectively. First connecting ring portion 14 further includes a plurality of flat rectangular segments 19 that are spaced from each other in the circumferential direction of first connecting ring portion 14 and connected with first bridge portions 13, respectively. Segments 19 are connected to blades 12 through first bridge portions 13, respectively. First connecting ring portion 14 further includes a plurality of first adjusting portions 20 that are disposed between respective adjacent two of segments 19 and connected with the respective adjacent two of segments 19. Each of first adjusting portions 20 is configured to adjust a distance between respective adjacent two of blades 12 and a radial dimension of blade structure 11 during the process for producing blade structure 11 as explained later. That is, during the process for producing blade structure 11, first adjusting portions 20 are deformed to thereby increase a distance between respective adjacent two of first bridge portions 13 and an outer diameter of blade structure 11. Specifically, each of first adjusting portions 20 is in the form of a strip having a generally V shape in plan view as shown in FIG. 2A. First adjusting portion 20 is formed into the generally V shape projecting outwardly in a radial direction of first connecting ring portion 14 or blade structure 11 and opening inwardly in the radial direction thereof. First adjusting portion 20 has a smaller cross section than segment 19, and therefore, first adjusting portion 20 is more deformable than segment 19.

Second connecting ring portion 16 includes a plurality of second bridge portions 15 that are spaced from each other in a circumferential direction of second connecting ring portion 16, and connected with blades 12, respectively. Second connecting ring portion 16 further includes a plurality of second adjusting portions 18 that are disposed between respective adjacent two of second bridge portions 15, and connected with the respective adjacent two of second bridge portions 15. Each of second adjusting portions 18 is configured to adjust the distance between respective adjacent two of blades 12 and the radial dimension of blade structure 11 in cooperation with first adjusting portions 20 during the process for producing blade structure 11 as explained later. That is, during the process for producing blade structure 11, second adjusting portions 18 are deformed to thereby increase a distance between respective adjacent two of second bridge portions 15 and an inner diameter of blade structure 11. Specifically, each of second adjusting portions 18 is in the form of a strip having a generally V shape in plan view as shown in FIG. 2A. Second adjusting portion 18 is formed into the generally V shape projecting inwardly in a radial direction of second connecting ring portion 16 or blade structure 11 and opening outwardly in the radial direction thereof.

Each of blades 12 includes lug 17 adapted to be engaged in a groove that is formed in the inner wall of turbine shell 10. Blade 12 is curved so as to create a desired flow of fluid within torque converter 1, and is mounted to the inner wall of turbine shell 10 at a predetermined angle. When lug 17 is engaged in the groove of turbine shell 10, blade 12 is placed in a predetermined position in radial and circumferential directions of turbine shell 10. With the engagement of lugs 17 with the grooves of turbine shell 10, blades 12 are arranged to be spaced by the predetermined distance apart from each other in the circumferential direction of turbine shell 10. Thus, lugs 17 serve for positioning blades 12 with respect to the inner wall of turbine shell 10.

First connecting ring portion 14 and second connecting ring portion 16 are welded to the inner wall of turbine shell 10. Blades 12 placed in the predetermined position through lugs 17 are brazed to the inner wall of turbine shell 10. Blade structure 11 is thus fixedly mounted to turbine shell 10.

A method of joining first and second connecting ring portions 14 and 16 with turbine shell 10 is not particularly limited to welding, and a method of joining blades 12 with turbine shell 10 is not particularly limited to brazing. Any other joining methods may be used as long as blade structure 11 can be suitably joined with turbine shell 10 without deteriorating the performance of torque converter 1.

As described above, blade structure 11 has blades 12 that are integrally formed with first connecting ring portion 14 and second connecting ring portion 16 through first bridge portion 13 and second bridge portion 15. Blades 12 can be simultaneously attached to turbine shell 10. Further, upon assembling blade structure 11 to turbine shell 10, the positioning of blades 12 relative to the grooves of turbine shell 10 can be readily carried out by lug 17.

Figure 3:
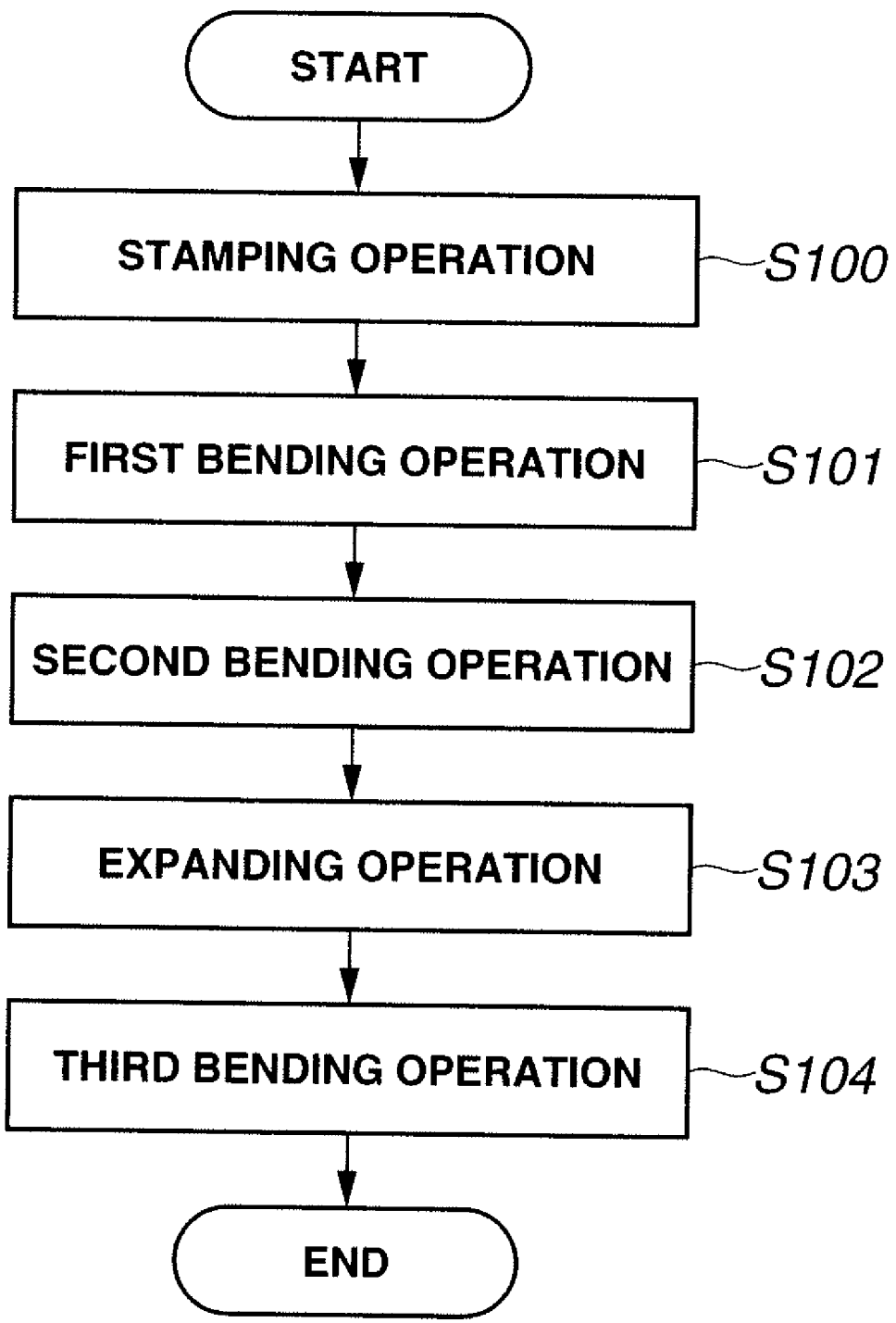
FIG. 3 is a flow chart showing a process for producing the blade structure of the embodiment.

Referring to FIGS. 3 to 6B, a process for producing blade structure 11 will be explained hereinafter. FIG. 3 is a flow chart showing the process for producing blade structure 11. FIGS. 4A to 6B are plan views and sectional views of preforms of blade structure 11 which are formed in the process of FIG. 3.

Figure 4A:
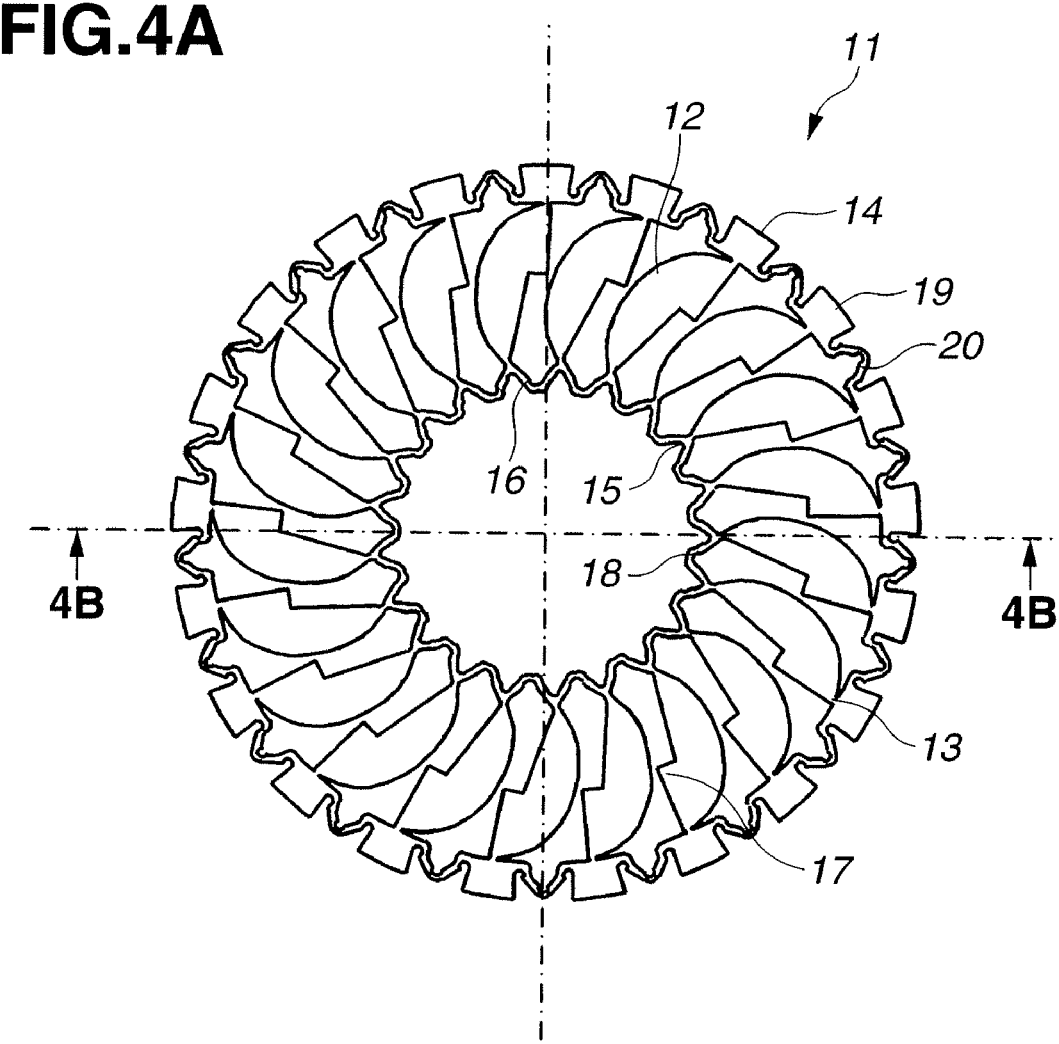
FIG. 4A is a plan view of a first preform of the blade structure of the embodiment which is formed in the process of FIG. 3.
Figure 4B:
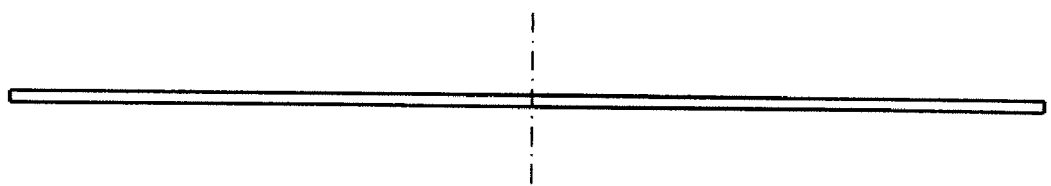
FIG. 4B is a sectional view of the first preform of the blade structure, taken along line 4B-4B shown in FIG. 4A.

As shown in FIG. 3, at step S100, a stamping operation is performed to form a flat blank into blade structure 11 as a first preform which is in the form of an annular flat plate as a whole. In the stamping operation, a single flat thin metal plate as the blank is stamped by a press into the annular flat plate-shaped blade structure 11 as shown in FIGS. 4A and 4B. The stamped blade structure 11 includes first connecting ring portion 14, second connecting ring portion 16, and a plurality of blades 12 between first connecting ring portion 14 and second connecting ring portion 16. First connecting ring portion 14 is disposed on a radial outside of the stamped blade structure 11 and in the form of an annular or ring-shaped flat plate. Blades 12 are disposed on a radial inside of first connecting ring portion 14 and spaced by a predetermined distance apart from each other in a circumferential direction of first connecting ring portion 14. Second connecting ring portion 16 is disposed on a radial inside of blades 12 and in the form of an annular or ring-shaped flat plate having a radial dimension smaller than first connecting ring portion 14.

Figure 5A:
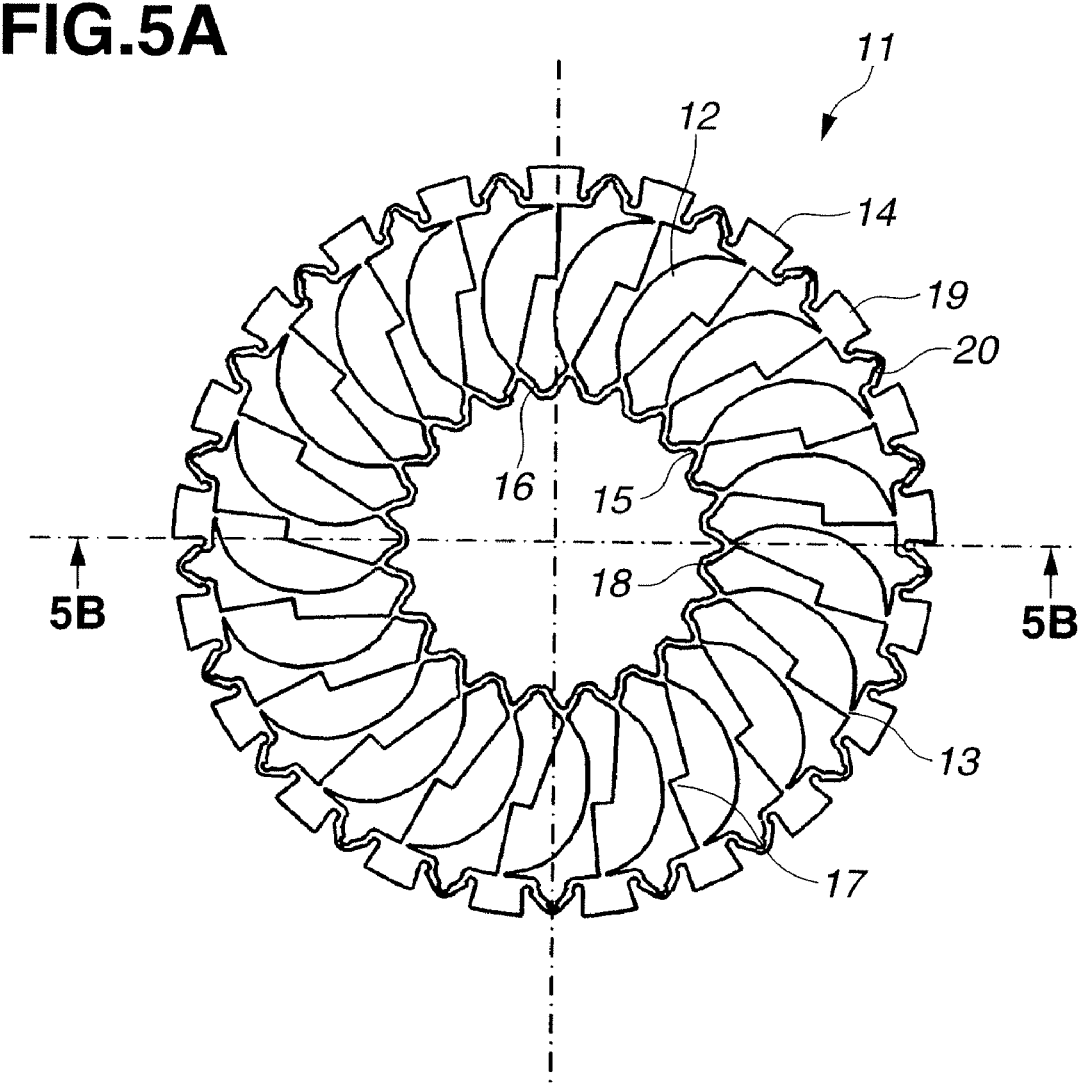
FIG. 5A is a plan view of a second preform of the blade structure of the embodiment which is formed in the process of FIG. 3.
Figure 5B:
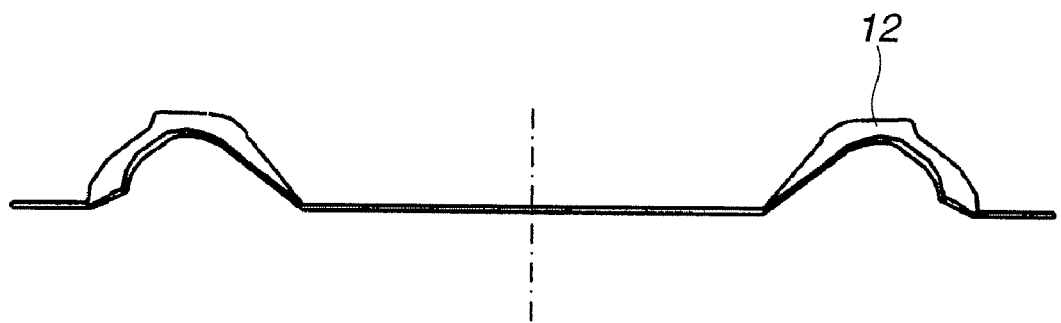
FIG. 5B is a sectional view of the second preform of the blade structure, taken along line 5B-5B shown in FIG. 5A.

At step S101, a first bending operation is performed to form the stamped blade structure 11 shown in FIGS. 4A and 4B into blade structure 11 as a second preform which has a generally annular shape shown in FIGS. 5A and 5B. In the first bending operation, respective blades 12 are pressed against a die and thereby bent into a curved shape as shown in FIGS. 5A and 5B. Specifically, respective blades 12 are bent into a predetermined curved shape that is curved with respect to annular flat plate-shaped blade structure 11, namely, with respect to annular flat plate-shaped first and second connecting ring portions 14 and 16. In the first bending operation, respective blades 12 are thus formed into the predetermined curved shape that corresponds to a substantially final shape of blades 12 in blade structure 11 to be mounted to turbine shell 10.

During the first bending operation, respective blades 12 are curved between first and second connecting ring portions 14 and 16 so as to project or raise upwardly from a base plane of annular flat plate-shaped blade structure 11 in a direction perpendicular to the base plane, that is, in a direction perpendicular to first and second connecting ring portions 14 and 16.

Figure 6A:
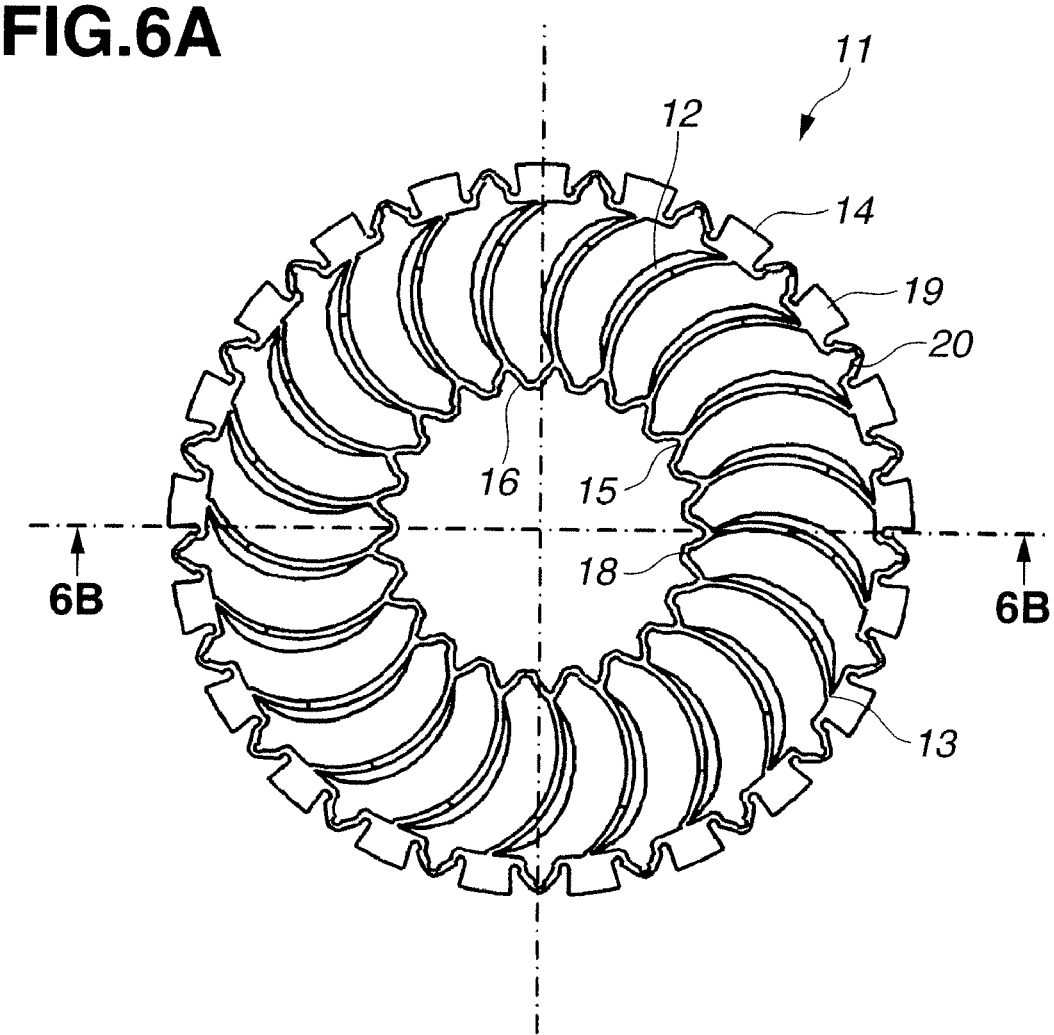
FIG. 6A is a plan view of a third preform of the blade structure of the embodiment which is formed in the process of FIG. 3.
Figure 6B:
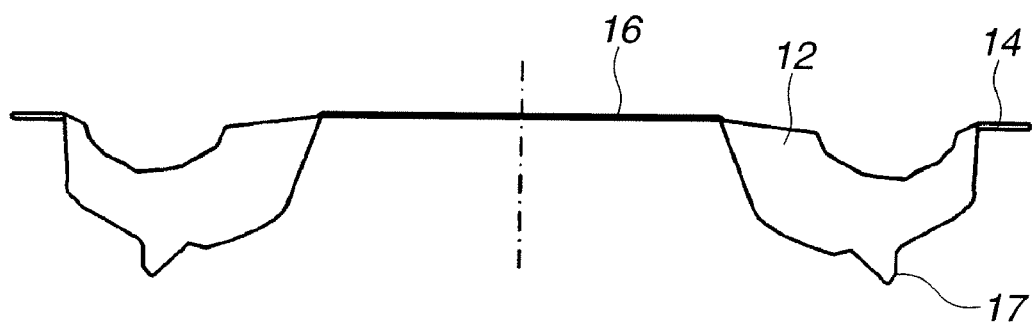
FIG. 6B is a sectional view of the third preform of the blade structure, taken along line 6B-6B shown in FIG. 6A.

At step S102, a second bending operation is performed to form blade structure 11 shown in FIGS. 5A and 5B into blade structure 11 as a third preform which has a generally annular shape as shown in FIGS. 6A and 6B. In the second bending operation, blade structure 11 shown in FIGS. 5A and 5B is pressed against a die so as to rotate respective blades 12 about first and second bridge portions 13 and 15 with respect to first connecting ring portion 14 and second connecting ring portion 16 and incline respective blades 12 by a predetermined angle with respect to a circumferential direction of blade structure 11. That is, during the second bending operation, respective blades 12 with lugs 17 are brought into the inclined state relative to first connecting ring portion 14 and second connecting ring portion 16, in which lugs 17 outwardly project so as to be engageable in the grooves of turbine shell 10. In the second bending operation, blades 12 are bent with a predetermined angle relative to first and second connecting ring portions 14 and 16 which serves as a final angle of blades 12 relative to turbine shell 10 in blade structure 11 mounted to turbine shell 10.

At step S103, an expanding operation is performed to form blade structure 11 bent in the second bending operation into a predetermined annular shape by a press or any other suitable method. In the expanding operation, blade structure 11 bent in the second bending operation is expanded outwardly in a radial direction thereof to thereby be formed into the predetermined annular shape that is substantially the same as the annular shape shown in FIGS. 2A and 2B. The predetermined annular shape has a radial dimension larger than the annular shapes of the first to third preforms, and has a circumferential distance between respective adjacent two of blades 12 which is larger than the circumferential distances between respective adjacent two of blades 12 in the first to third preforms.

During the expanding operation, first adjusting portions 20 of first connecting ring portion 14 are deformed to expand in the circumferential direction of first connecting ring portion 14, but segments 19 of first connecting ring portion 14 are not deformed. On the other hand, second adjusting portions 18 of second connecting ring portion 16 are deformed to expand in the circumferential direction of second connecting ring portion 16.

As a result, the predetermined annular shape of blade structure 11 which is radially outwardly expanded by the expanding operation is formed from the annular shape of blade structure 11 shown in FIGS. 4A and 4B. That is, the predetermined annular shape formed by the expanding operation has an increased radial dimension, i.e., increased outer and inner diameters, as compared to the annular shape of blade structure 11 shown in FIGS. 4A and 4B.

At step S104, a third bending operation is performed. In the third bending operation, first connecting ring portion 14 and second connecting ring portion 16 of blade structure 11 having the predetermined annular shape are pressed to be fitable to the inclined inner wall of turbine shell 10. Blade structure 11 is thus completed. Subsequently, blade structure 11 is assembled to turbine shell 10.

Thus formed blade structure 11 is placed in the predetermined position relative to turbine shell 10 by staking lugs 17 into the grooves of the inner wall of turbine shell 10, and then fixed to turbine shell 10 by brazing or welding.

As explained above, blade structure 11 can be formed from a single flat thin metal plate and can be readily mounted to turbine shell 10.

The process for producing blade structure 11 is not limited to the above embodiment in which the first bending operation and the second bending operation are performed before the expanding operation. The first bending operation and the second bending operation may be performed after the expanding operation.

In accordance with the embodiment of the present invention, the following functions and effects can be attained.

In the embodiment, the plurality of blades 12 are connected to first connecting ring portion 14 through first bridge portion 13 and second connecting ring portion 16 through second bridge portion 15 so that blades 12 are integrally formed with each other in blade structure 11. Therefore, the plurality of blades 12 can be assembled to turbine shell 10 simultaneously, serving for remarkably reducing the working time. Further, when assembling blade structure 11 to turbine shell 10, the positioning of blade structure 11 relative to turbine shell 10 can be readily carried out by engaging lugs 17 of blades 12 with the grooves of turbine shell 10. The assembling operation can be performed with increased working efficiency.

Further, first connecting ring portion 14 is provided with segments 19 and first adjusting portions 20. With the provision of segments 19 and first adjusting portions 20, the strength of blade structure 11 can be enhanced by segments 19, and the outer diameter of blade structure 11 and the distance between the respective adjacent two of blades 12 in the circumferential direction of blade structure 11 can be adjusted by first adjusting portions 20.

Especially, by the expanding operation as described above, blade structure 11 can be deformed from the annular shape of the first preform which has a small radial dimension, namely, a small area, into the predetermined annular shape that has a larger radial dimension, namely, a larger area. This serves for enhancing yield of material.

Further, each of blades 12 includes lug 17 that projects from a surface of blade 12 to come into contact with the inner wall of turbine shell 10 and is engaged with the groove formed in the inner wall of turbine shell 10. When assembling blade structure 11 to turbine shell 10, the positioning of blades 12 relative to turbine shell 10 can be readily performed by engaging lugs 17 in the grooves. Therefore, blade structure 11 can be easily assembled to turbine shell 10, serving for enhancing the working efficiency.

Further, the location of each of first bridge portions 13 of first connecting ring portion 14 is not limited to the above embodiment in which first bridge portion 13 is disposed in a substantially middle of segment 19 in the circumferential direction of first connecting ring portion 14 as shown in FIG. 4A. Each of first bridge portions 13 may be offset from the middle of each of segments 19 in the circumferential direction of first connecting ring portion 14. For instance, each of first bridge portions 13 may be offset from the middle of each of segments 19 in a circumferential direction of first connecting ring portion 14 which is opposite to a direction in which each of blades 12 is curved. That is, first bridge portion 13 may be offset in a clockwise direction when viewed in FIG. 4A. As a result, when first adjusting portions 20 are deformed in the expanding operation at step S103, the angle of each of blades 12 with respect to the radial direction of blade structure 11 can be offset or inclined in the direction in which each of blades 12 is curved, namely, in the counterclockwise direction when viewed in FIG. 4A.

Further, each of second bridge portions 15 may be offset from a substantially middle of each of segments 19 in the circumferential direction of second connecting ring portion 16. In this case, it is possible to obtain the same effects as those in the offset arrangement of first bridge portion 13.

Furthermore, application of blade structure 11 is not limited to the above embodiment in which blade structure 11 is mounted to turbine shell 10 so as to form turbine runner 5, and may also be mounted to rear cover 3 as an impeller shell so as to form pump impeller 4.

This application is based on prior Japanese Patent Application No. 2007-225859 filed on Aug. 31, 2008. The entire contents of the Japanese Patent Application No. 2007-225859 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A blade structure for a torque converter, produced by a process comprising the steps of:
    stamping a flat blank into a first annular plate that includes a first connecting ring portion, a second connecting ring portion disposed on a radial inside of the first connecting ring portion and a plurality of blades that are arranged to be spaced from each other in a circumferential direction of the first and second connecting ring portions, and connected with the first connecting ring portion on a radial outside of the blades and with the second connecting ring portion on a radial inside of the blades;
    bending the blades into a curved shape curved with respect to the first annular plate;
    bending the blades to be inclined by a predetermined angle with respect to the first connecting ring portion and the second connecting ring portion; and
    expanding the first annular plate outwardly in a radial direction thereof to thereby form a predetermined annular shape that has a larger radial dimension than the first annular shape and a larger circumferential distance between respective adjacent two of the blades than that in the first annular plate,
    wherein the first connecting ring portion comprises:
        a plurality of first bridge portions that are spaced from each other in a circumferential direction of the first connecting ring portion and connected with the blades, respectively;
        a plurality of segments that are spaced from each other in the circumferential direction of the first connecting ring portion and connected with the first bridge portions, respectively; and
        a plurality of first adjusting portions that are disposed between respective adjacent two of the segments and connected with the respective adjacent two of the segments,
        each of the first adjusting portions being configured to adjust a distance between respective adjacent two of the first bridge portions when the expanding step is performed, and
    wherein each of the first adjusting portions is formed into a generally V shape to project in a radially outward direction of the first connecting ring portion.

2. The blade structure as claimed in claim 1, wherein the process further comprises bending the first connecting ring portion and the second connecting ring portion to be fitable to a shell into which the blade structure is assembled.

3. The blade structure as claimed in claim 1, wherein each of the first bridge portions is disposed in a substantially middle of each of the segments in the circumferential direction of the first connecting ring portion.

4. The blade structure as claimed in claim 1, wherein each of the first bridge portions is offset from a middle of each of the segments in the circumferential direction of the first connecting ring portion which is opposite to a direction in which each of the blades is curved.

5. A blade structure for a torque converter, produced by a process comprising the steps of:
    stamping a flat blank into a first annular plate that includes a first connecting ring portion, a second connecting ring portion disposed on a radial inside of the first connecting ring portion and a plurality of blades that are arranged to be spaced from each other in a circumferential direction of the first and second connecting ring portions, and connected with the first connecting ring portion on a radial outside of the blades and with the second connecting ring portion on a radial inside of the blades;
    bending the blades into a curved shape curved with respect to the first annular plate;
    bending the blades to be inclined by a predetermined angle with respect to the first connecting ring portion and the second connecting ring portion; and
    expanding the first annular plate outwardly in a radial direction thereof to thereby form a predetermined annular shape that has a larger radial dimension than the first annular shape and a larger circumferential distance between respective adjacent two of the blades than that in the first annular plate,
    wherein the second connecting ring portion comprises:
        a plurality of second bridge portions that are spaced from each other in a circumferential direction of the second connecting ring portion and connected with the blades, respectively; and
        a plurality of second adjusting portions that are disposed between respective adjacent two of the second bridge portions and connected with the respective adjacent two of the second bridge portions,
        each of the second adjusting portions being configured to adjust a distance between respective adjacent two of the second bridge portions when the expanding step is performed, and
    wherein each of the second adjusting portions is formed into a generally V shape to project in a radially inward direction of the second connecting ring portion.

6. The blade structure as claimed in claim 5, wherein the process further comprises bending the first connecting ring portion and the second connecting ring portion to be fitable to a shell into which the blade structure is assembled.

7. A process for producing a blade structure for a torque converter, comprising the steps of:
    stamping a flat blank into a first annular plate that includes a first connecting ring portion, a second connecting ring portion disposed on a radial inside of the first connecting ring portion and a plurality of blades that are arranged to be spaced from each other in a circumferential direction of the first and second connecting ring portions, and connected with the first connecting ring portion on a radial outside of the blades and with the second connecting ring portion on a radial inside of the blades;

bending the blades into a curved shape curved with respect to the first annular plate;

bending the blades to be inclined by a predetermined angle with respect to the first connecting ring portion and the second connecting ring portion; and expanding the first annular plate in a radial direction thereof to thereby form a predetermined annular shape that has a larger radial dimension than the first annular shape and a larger circumferential distance between respective adjacent two of the blades than that in the first annular plate.

8. The process as claimed in claim 7, further comprising bending the first connecting ring portion and the second connecting ring portion to be fitable to a shell into which the blade structure is assembled.

9. The process as claimed in claim 7, wherein the first connecting ring portion comprises:

a plurality of first bridge portions that are spaced from each other in a circumferential direction of the first connecting ring portion and connected with the blades, respectively;

a plurality of segments that are spaced from each other in the circumferential direction of the first connecting ring portion and connected with the first bridge portions, respectively; and a plurality of first adjusting portions that are disposed between respective adjacent two of the segments and connected with the respective adjacent two of the segments, each of the first adjusting portions being configured to adjust a distance between respective adjacent two of the first bridge portions when the expanding step is performed.

10. The process as claimed in claim 9, wherein each of the first adjusting portions is formed into a generally V shape that projects in a radially outward direction of the first connecting ring portion.

11. The process as claimed in claim 7, wherein the second connecting ring portion comprises:

a plurality of second bridge portions that are spaced from each other in a circumferential direction of the second connecting ring portion and connected with the blades, respectively; and a plurality of second adjusting portions that are disposed between respective adjacent two of the second bridge portions and connected with the respective adjacent two of the second bridge portions, each of the second adjusting portions being configured to adjust a distance between respective adjacent two of the second bridge portions when the expanding step is performed.

12. The process as claimed in claim 11, wherein each of the second adjusting portions is formed into a generally V shape that projects in a radially inward direction of the second connecting ring portion.

13. The process as claimed in claim 7, wherein each of the first bridge portions is disposed in a substantially middle of each of the segments in the circumferential direction of the first connecting ring portion.

14. The process as claimed in claim 7, wherein each of the first bridge portions is offset from a middle of each of the segments in the circumferential direction of the first connecting ring portion which is opposite to a direction in which each of the blades is curved.

* * * * *